United States Patent [19]

Preston et al.

[11] Patent Number: 4,962,668

[45] Date of Patent: Oct. 16, 1990

[54] MATERIAL STRESS MONITOR

[76] Inventors: Christopher J. Preston, 1225 Glenwood Road, North Bay, Ontario, Canada P1B 4S7; John J. Cotter, 982 Jane Street, North Bay, Ontario, Canada P1B 3H7; John Codrington, 50 Melrose Drive, R.R. #1, Niagara-on-the-Lake, Ontario, Canada; Dimitri Frantzos, 3270 Fairway Road, Niagara Falls, Ontario, Canada L2J 3R6; Pierre Hamel, 36 Marlowe Cr., Ottawa, Ontario Canada K1S 1H6

[21] Appl. No.: 346,681

[22] Filed: May 3, 1989

[30] Foreign Application Priority Data

May 6, 1988 [CA] Canada ................................. 566248

[51] Int. Cl.$^5$ ............................................. G01B 7/16
[52] U.S. Cl. ......................................... 73/784; 73/587
[58] Field of Search .................. 73/784, 768, 84, 587

[56] References Cited

U.S. PATENT DOCUMENTS

| 4,461,177 | 7/1984 | Feng ..................................... 73/587 |
| 4,491,022 | 1/1985 | de la Cruz ............................ 73/783 |
| 4,510,812 | 4/1985 | Feng ..................................... 73/644 |
| 4,517,842 | 5/1985 | Twomey et al. ..................... 73/701 |
| 4,760,741 | 8/1988 | Koopmans et al. .................. 73/784 |

FOREIGN PATENT DOCUMENTS

| 46079 | 2/1982 | European Pat. Off. . |
| 8606830 | 11/1986 | PCT Int'l Appl. . |
| 1167270 | 10/1969 | United Kingdom . |
| 13122764 | 4/1973 | United Kingdom . |

OTHER PUBLICATIONS

IEEE Transactions on Nuclear Science, vol. NS-27, No. 4, Aug. 1980, pp. 1291-1298, New York, U.S.; E. P. Binnall: "Instrumentation and Computer Based Data Acquisition for In-Situ Rock Property Measurements", *p. 1296, paragraph 3-p. 1297, paragraph 3; figures*.

Paper entitled Three Component Borehole Deformation Gage Roctest Ltee Ltd.

Four page document relating to USBM Gage from Improvements in The Three Component Borehole Deformation Gage and Overcoring Techniques USBM RI7894.

Primary Examiner—Jerry W. Myracle
Attorney, Agent, or Firm—Rogers, Bereskin & Parr

[57] ABSTRACT

A sensor unit is disclosed for use in monitoring in situ changes in dynamic and static stress properties of any material to be monitored, such as monolithic concrete or underground rock structures. The sensor unit includes a hollow, waterproof tubular body to be inserted into a cylindrical borehole in the material to be monitored. A transducer is mounted within the body, which by means of strain gauges, provides an output signal responsive to deflection of the sidewall of the borehole. The transducer is coupled to the sidewall by means of pressure buttons. A monitor is also disclosed, which comprises the sensor unit, a data collection unit and a data analyzing unit. A method for sensing dynamic and static changes in material stresses is also disclosed.

18 Claims, 4 Drawing Sheets

MATERIAL STRESS MONITOR

FIELD OF THE INVENTION

The present invention relates to monitors used in determining stresses that may be present in any substantial mass of material, such as rock strata or concrete or other structures. In particular, the present invention relates to a type of monitor, and a method of using the monitor, to conduct in situ measurements of changes in material stresses.

BACKGROUND OF THE INVENTION

In many situations it is desirable to be able to monitor changes in stress in substantial masses of material. For example, in underground mines, as material is mined out to create a tunnel or other opening, a low pressure region is created in the mined material adjacent the wall of the opening, by reason of removal of the mined material. Stress levels in the mass being mined, will tend to equilibriate, causing changes in the stress levels at various points in the mass. If the stress changes are severe enough, failure of the mass is likely to occur, in reaching a new equilibrium state. Such failures are often referred to as "rock bursts".

In the past, various methods have been tried to attempt to predict the likelihood of a "rock burst" occurring. One method was to monitor the noise level in the rock as the stress pattern was changing. However, to date, it has proved very difficult to usefully correlate the noise level in the rock mass to the likelihood of a rock burst occurring. Another way, has been through the use of a borehole sensor unit, commonly known as the United States Bureau of Mines type of Borehole Deformation Guage (USBM gauge). However, the USBM guage has several severe limitations.

Essentially the USBM guage consists of a probe which is inserted into a borehole. Three pairs of strain-guaged cantilevers are mounted in a water-proof casing, to sense deformation of the borehole walls. The testing procedure consists of drilling an access hole, with a typical diameter of about 6 inches to the depth where testing is required. Then, a co-axial hole 1.5 inches in diameter is drilled, and the USBM gauge is inserted therein in a known orientation. Then, the co-axial 1.5 inches in diameter hole is over bored, typically with a 6 inch diameter overcoring cut. Then, the overcored material is removed, and the change in diameter due to relaxation of the borehole is measured when the core is removed from the host rock. Calculations are then made, based on the one time deformation recorded by the USBM gauge about the level of static stress present in the formation being tested.

However, the above method of measurement has several major disadvantages. Firstly, the testing required is very expensive and time consuming. For each test, three separate drilling operations are required to make a 6 inch hole, a 1.5 inch hole then a 6 inch over-core cut. Further, once the overcoring operation is complete, the rock tube containing the USBM gauge is removed. Therefore, the method only provides for a one time measurement of stress in the rock; it cannot, without conducting further tests, provide analysis of how the stresses in the rock are changing over time, as a result of mining operations. A number of tests are required over time to produce a statistically meaningful profile to changes in the static stress levels. Such a testing technique also requires a good deal of manpower and time and is expensive.

Further, dynamic stress levels, such as may occur as a result of underground blasting, or repetitive loading for example in a concrete bridge footing, or the movement of heavy machinery underground, cannot be sensed, as the USBM gauge is removed from the rock or other material to be tested. Dynamic loading can create stress excursions in the material which may, in certain instances, exceed the strength of the rock mass, and hence trigger a rock burst.

What is desired therefore is a material stress monitor that is easy to install with a minimum of drilling operations being required. What is also desired, is a material stress monitor, that will provide a real time record of changes in stress in the material being monitored, both in respect of static and dynamic loading, so as to help in the prediction of the likelihood of a rock burst occurring or to determine for example the timing of blasting delay periods.

SUMMARY OF THE INVENTION

Therefore, according to the present invention there is disclosed a sensor unit for use in an in situ material stress monitor for measuring changes in static and dynamic material stresses, said sensor unit being mountable in a borehole in the material to be monitored, the sensor unit comprising:
  a generally hollow waterproof tubular body and means for shock isolating said body from said material,
  a transducer mounted within said body, said transducer providing an output signal responsive to the deflection of the sidewall of the borehole,
  and a means for coupling said transducer to said sidewall.

According to another aspect of the invention there is disclosed an in situ material stress monitor comprising a sensor-unit, a data collection unit and a data analyzing unit,
  the sensor unit being adapted to be mounted in a borehole in the material to be monitored and coupled with a sidewall thereof, said sensor unit including a means for providing an output signal proportional to the deflection of the side wall of the borehole, a means for converting said output signal to a coded binary data signal and a means for directing said data signal to the data collection unit,
  the data collection unit collecting said coded binary data signal, said data collection unit including a means for storing said coded binary data and means for transmitting said coded binary data to the data analyzing unit; and
  the data analyzing unit including means for receiving and storing said coded binary data from said data collection unit, and means for analyzing said coded binary data.

According to another aspect of the invention there is disclosed a method of monitoring in situ changes in static and dynamic material stresses, said method comprising:
  (a) forming a borehole in the material to be monitored
  (b) inserting a sensor unit therein;
  (c) orienting the sensor unit to a preferred orientation;
  (d) sensing deflection of the sidewalls of the borehole;
  (e) converting said deflection into coded binary data and (f) analyzing said data produced by said monitoring to determine changes in said material stresses.

Figure 1:
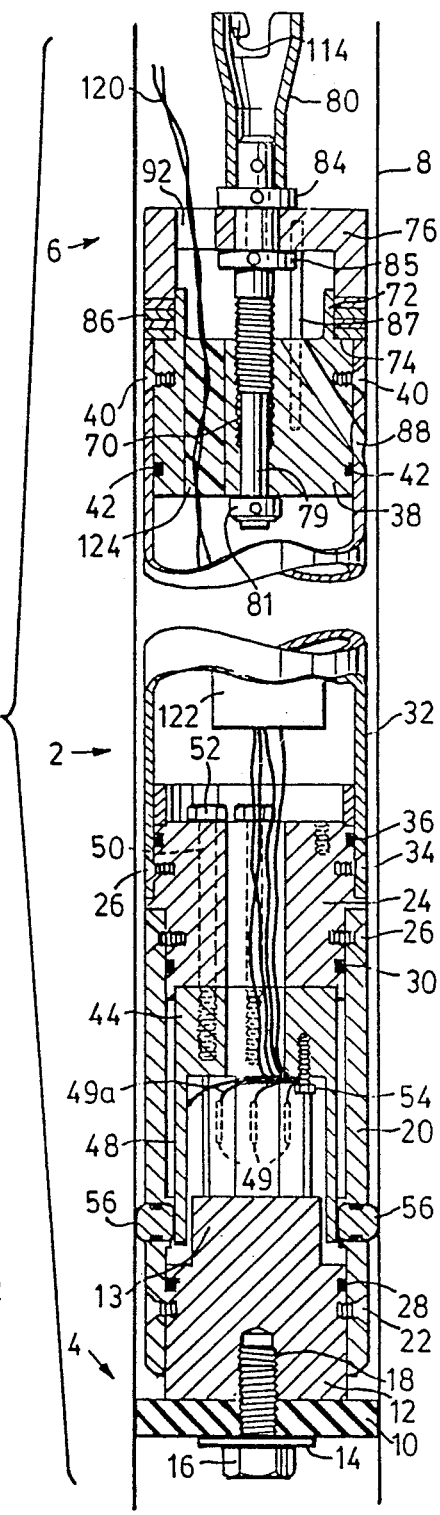
FIG. 1 is a plan view in section of a sensor unit according to the present invention.

According to the present invention, there is disclosed a sensor unit indicated generally at 2 in FIG. 1. The sensor unit 2 has a head or front end 4, and a trailing end 6. The sensor unit 2 is shown inside a borehole 8. Referring to the head end 4 of the sensor unit 2 there is disclosed a resilient flange 10, preferably made from an elastomeric material, having the same diameter as the borehole 8. Alternatively, the flange 10 may be made of slightly larger diameter, so that upon insertion into the borehole 8, it is slightly compressed. The flange 10 is retained against a head block 12 by means of a bolt 14 with a washer 16. The bolt 14 is inserted in a threaded bolt hole 18 and can be tightened to securely hold the flange 10 in place.

The head block 12 in turn is retained within a head tubular element 20 by means of screws 22 as shown. The end of the front tubular element 20 distant from the head block 12 is attached to a middle block 24 in a like manner by screws 26. As shown in FIG. 1, O-ring seals 28 and 30 are provided at opposite ends of the front tubular element 20 to prevent water from penetrating to the interior of the tubular element 20. The head block 12 also includes a rearward cylindrical protrusion 13 which is of somewhat narrower diameter than the remainder of the head block 12. The purpose of the protrusion 13 is described below.

The middle block 24 has two main structural functions. Its first function is to form a secure joint between the front tubular element 20 and a rear tubular element 32 which in turn forms a majority of the remainder of the tubular body of the sensor unit 2. The rear tubular element 32 is attached to the middle block 24 by means of screws 34. Again, an O-ring 36 is provided to prevent leakage or seepage of water into the interior of the rear tubular element 32. Shown at the trailing end 6 of the sensor unit 2 is a rear block 38. The rear block 38 is secured to the rear tubular element 32 by means of screws 40 and again an O-ring 42 is provided.

Figure 3:
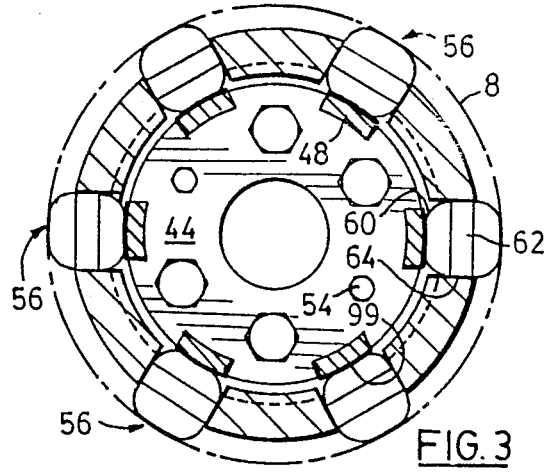
FIG. 3 is a cross-sectional view along the lines 3—3 of the sensor unit of FIG. 1.

A second main function of the middle block 24 is to house a transducer 44 of the sensor unit 2. The transducer 44 is a monolithic element having a base 46 and a number of cantilevered sensing levers 48. Bolts 50 having heads 52 are provided to secure the base 46 of the transducer 44 to the middle block 24 of the sensor unit 2. The bolts 50 are tapped into the base 46 of the transducer 44 as shown in FIG. 1. Alternatively, bolts 50 could be through bolts. In such a case, as shown in FIG. 3 the heads 52 of the bolts 50 would be on the transducer 44 side. Nuts (not shown) would be used at the far end of the through bolts 50 to secure the transducer 44 to the middle block 24. As can be seen from FIG. 3, four bolts 50 are preferred although this number may be varied. Also shown in FIG. 3, are screws 54 the purpose of which is described below.

FIG. 3 is a cross-sectional view looking towards the trailing end of the sensor unit of FIG. 1. The borehole wall 8 is shown in dotted outline. Also shown is a means for coupling the wall of the borehole 8 with the transducer 44. In particular, six pressure buttons 56 are shown which are generally circular in cross section. The pressure buttons 56 have part spherical inner and outer surfaces 58 and 60 respectively. Also shown are seals 62. The pressure buttons 56 are free to move inwardly or outwardly of the front tubular element 20 in respective channels 64. The seals 62 prevent water from passing between the pressure buttons 56 and the channels 64 into the interior of the front tubular element 20.

As can be seen in FIG. 1, the inner surface 60 of each pressure button 56 contacts a sensing lever 48 near its free end. In this manner, deflections of the borehole wall 8 are communicated to the transducer 44. It will now be appreciated that protrusion 13 acts an overtravel stop for the sensing levers 48, which prevents overstressing (ie non-elastic deformation) the sensing levers 48.

The transducer 44 is adapted to convert the lateral deflection of the free ends of the levers 48 into electrical impulses. This conversion is accomplished by means of a number of strain gauges 49, preferably four, connected in the form of a wheatstone bridge and secured to each lever 48. The electrical circuitry is described in more detail below. The strain gauges 49 must be secured in such a manner to avoid creep in the mounting material of the gauges 49 over time, which would affect the readings. Diametrically opposed levers 48 act as a sensing pair. The strain gauges 49, have a trailing wire 49a, which electrically connects the strain gauges 49 as described below. It will now be appreciated that the screws 54 act as a strain relief stop to prevent the wires 49a from being pulled and disturbing the mounting of the strain gauges 49.

It will be noted that the outer surfaces 68 of the levers 48 are curved in cross-section as shown in FIG. 3. This feature of the invention allows for a secure point contact between the pressure button 56 and the lever 48 even if there is a skewed displacement of the pressure button 56. This enhances the sensitivity of the sensor unit 2 in monitoring dynamic loading.

The transducer is preferably formed from a solid rod of 17-4PH stainless steel hardened after machining. The levers 48 are preferably milled out of the rod, leaving the outer surfaces 68. In this manner, the levers 48 will all have virtually identical properties, since they are formed from metal which has undergone the same formation process. In addition, since they are formed from the same piece of material as the base 46, repeated dynamic loading will not cause any loosening of the joint with the base 46, such as would occur if the levers were, for example, bolted to the base 46. Therefore, the use of a monolithic transducer enables the frequency response of the levers 48 to become a design specification. It has been found that good results are obtained when the frequency response of the sensing levers is up to about 20 khz. Satisfactory results have also been found with a natural response frequency at about 4 khz. This is sufficient to measure most dynamic stress excursions. However, greater dynamic sensitivity could be obtained by increasing the stiffness of the sensing levers 48 and thereby increasing the natural response frequency to higher than 20 khz. However, this could create difficulties in inserting the sensing unit into the borehole, as it would be difficult to deflect the stiffer sensing levers 48 to allow the pressure buttons 56 to be inserted in the borehole 8. Also, if the outward force on the pressure buttons 56 is too large, it will begin to affect the readings, by in essence supporting the borehole wall 8. This will reduce the static stress monitoring sensitivity of the sensor unit 2. Other factors that enhance sensitivity of the preferred invention, include the external diameter which is preferably 2.980" or about twice that of the USBM gauge. The use of four strain gauges on each lever 48, further enhances the sensitivity and temperature stability.

Figure 2:
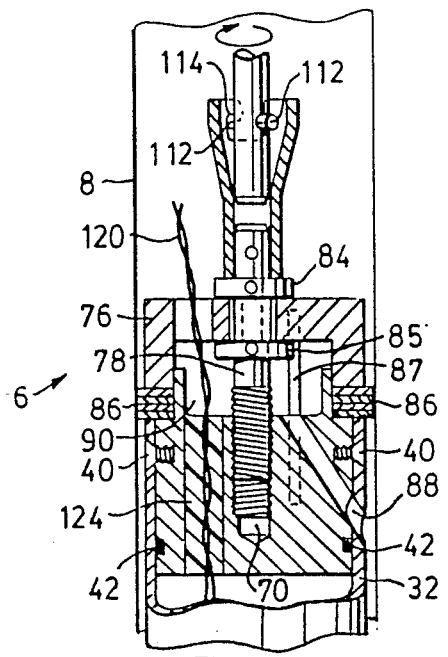
FIG. 2 is a view in section of one end of the sensor unit of FIG. 1 secured within a borehole.

Returning to FIG. 1, located at the trailing end 6 are a number of elements which cooperate to allow the sensor unit to be oriented to a specific orientation in the borehole 8. A central threaded bore 70 is located in rear block 38. Rear block 38 is provided with a rearwardly projecting rim 72 and a shoulder 74. A non-rotatable end cap 76 is also shown. Extending through end cap 76 is a rotatable threaded element 78 having a rearwardly opening flange member 80. The threaded element 78 is rotatably disposed in a hole 82 centrally positioned in end cap 76. Flanges 84 and 85 transmit displacement of the threaded element 78 along the longitudinal axis of sensor unit 2 to the end cap 76. The element 78 is so displaced by being rotated into or out of threaded central bore 70 of rear block 38. In this manner, as the threaded element 78 is rotated, a plurality of elastomeric washer members 86 may be compressed between the end cap 76 and the shoulder 74 of the rear block 38. As the compression increases, the elastomeric washer members 86 are forced outwardly thereby securing the trailing end 6 of the sensor unit 2 centrally within the borehole 8 as shown in FIG. 2. A pair of pins 87 are provided (only one of which is shown in FIG. 1) to prevent any rotation of the end cap 76.

While in FIG. 2, the threaded element 78 is shown in a closed-ended threaded bore 70, the construction shown in FIG. 1 is somewhat different, and is shown as an alternative. In FIG. 1, threaded element 78 includes a smooth shank 79, which ends in a ring 81 fixed to the shank 79. The threaded bore 70 also has a smooth wall portion 71 as shown. In this manner, the end cap 76 will not be able to be completely unscrewed from the sensor 2, which has an obvious disadvantage.

To prevent any water leaking into the borehole 8 from building up pressure between the seal created by the compression of the elastomeric washer members 86 and the flange 10 at the head end of the sensor unit 2, a via or channel 88 is provided. This channel 88 extends through the rear tubular element 32 and the rear block 38 into a interior chamber 90 at the trailing end 6 of the sensor unit 2. The interior chamber 90 in turn has an exit 92 through which any water may pass.

Figures 4, 5:
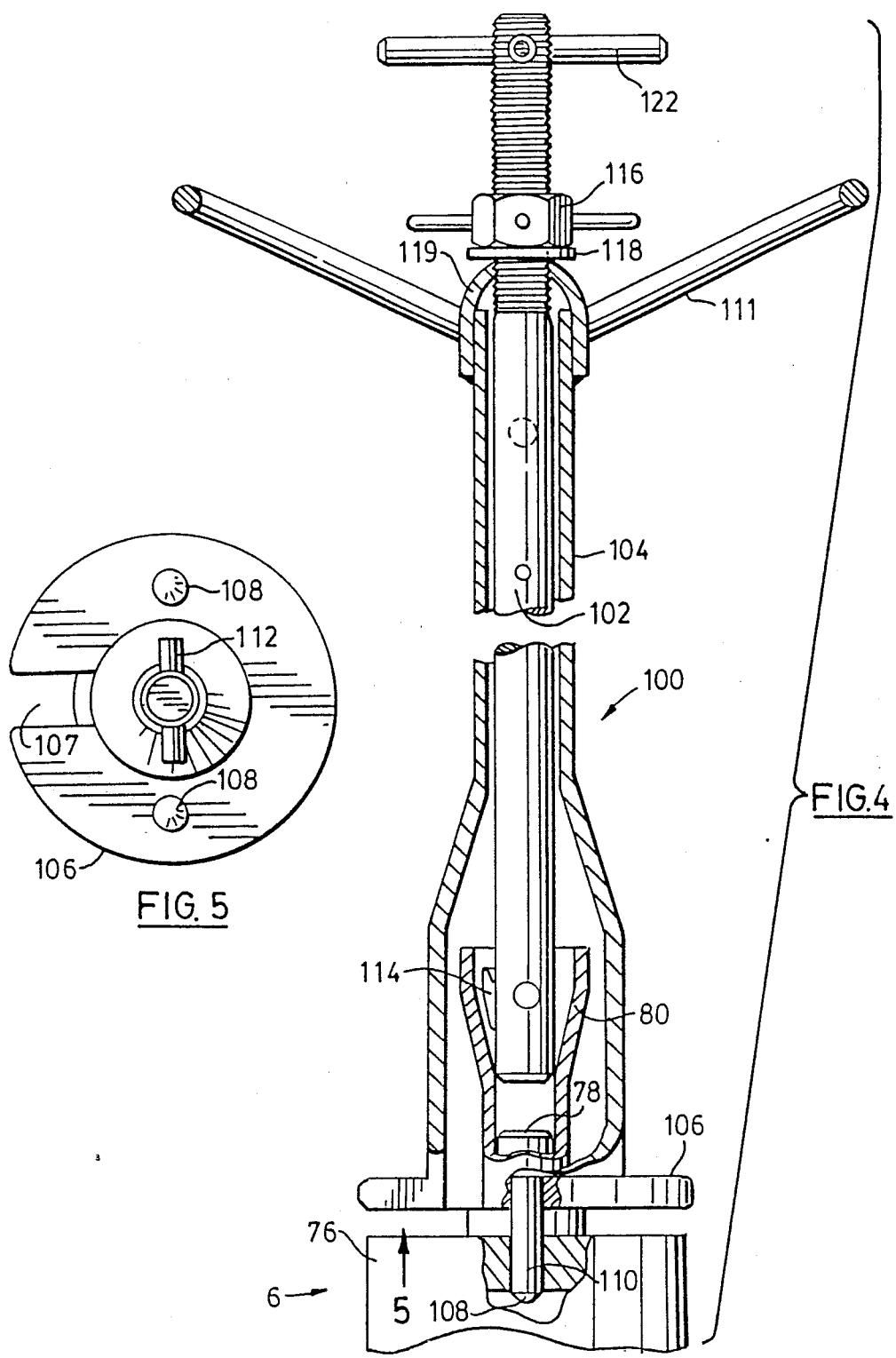
FIG. 4 is a view of a mounting tool for the sensor unit of FIG. 1.
FIG. 5 is an end view of the mounting tool of FIG. 4.

Turning now to FIG. 4, it will be appreciated how the sensor unit may be oriented in the borehole 8. A tool indicated generally at 100 is shown in FIG. 4. The tool 100 is comprised of a central shaft 102 and a surrounding sheath 104. The central shaft 102 is rotatably disposed within the sheath 104. At the front end of the sheath 104 is located a circular flange 106 having approximately the same diameter as the borehole 8. A pair of protruding pins 108 extend outwardly from flange 106 and will be received in a pair of like holes 110 located in the trailing end 6 of the sensor unit 2. By reason of the flange 106 being approximately the same diameter as the borehole 8, the pins 108 will be relatively easy to insert into the holes 110.

A handle structure 111 is provided to help orient the pins 108 in the holes 110 and the sensor unit 2 in any preferred orientation in the borehole 8. Located at the end of central shaft 102 are opposed laterally extending cams 112. The cams 112 are designed to lock into a key ways 114 which are located in the flange member 80 of the trailing end 6 of the sensor unit 2. Once the cams 112 are inserted in the key ways 114 the central shaft 102 can be retracted somewhat and locked in the key way 114 by means of a lock nut 116 located at the rear end of the tool 100. A washer 118 is provided to allow sliding movement between a cap 119 of the sheath 104 and the locknut 116.

A second handle structure 122 is provided for rotating the central shaft 102. In this manner the rotatable threaded element 78 can be rotated and the sensor unit 2 secured to the borehole 8 by the elastomeric washer members 86. By use of appropriate connecting members the tool 100 can be extended to any desired length, although it is preferably not to exceed about 50 feet. Referring to FIG. 2, the tool 100 is shown turning rotatable threaded element 78 thereby compressing elastomeric washers 86 between the end cap 76 and the shoulder 74 of rear block 38. Note that only the central shaft 102 of the tool 100 is shown in FIG. 2, and the sheath 104 and the flange 106 have been left out for illustration purposes only. Note also that the cam 112 is shown in the key way 114.

Referring to FIG. 5, the flange 106 is shown with a gap 107 which is provided for the trailing wires from the sensor unit 2. Referring back to FIG. 1, the wires, shown as 120, are connected to a circuit board 122, located within the rear tubular element 32. After the circuit board 122 is installed, the wires 120 are passed through an opening 124 in the rear block 38. The opening 124 can then be sealed, as shown, for example by silicon rubber 126. The wires 120 then pass through the exit 92 of chamber 90.

Figure 7:
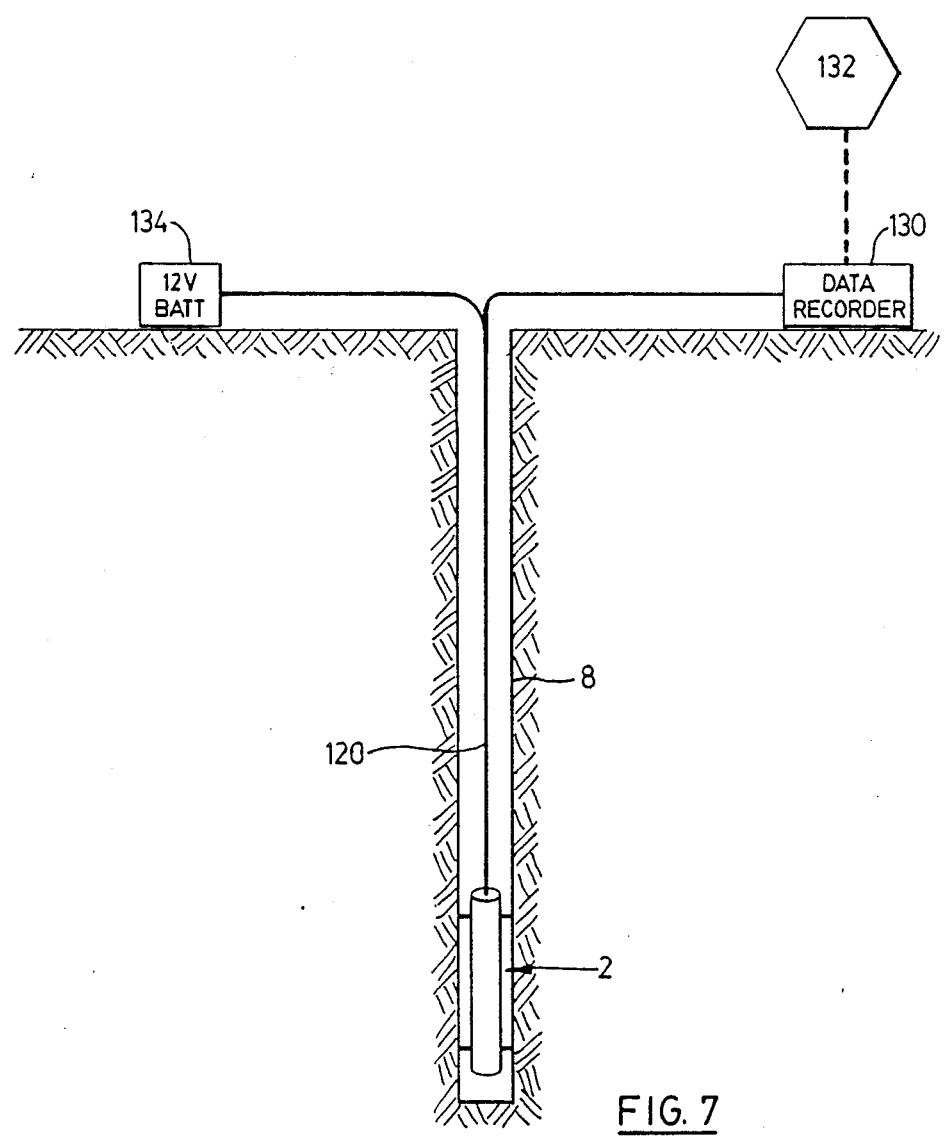
FIG. 7 is a schematic diagram of a stress monitor according to the present invention.

Referring to FIG. 7, a schematic representation is shown of a material stress monitor, which comprises a borehole sensor unit 2, a data collection unit 130 and a data analyzing unit 132. As indicated above, located in the borehole sensor unit 2, in the rear tubular element 32 is a circuit board 122. The circuitboard may be mounted within rear tubular element 36 in any convenient manner, such as by a pair of spacer rings (not shown). The circuit board 122 is connected, electrically, to the strain gauges 49. The circuit board 122 enhances the outputs from the transducer 44. Such outputs are then sent by wires 120, which are preferably twisted wire cables, to the data collection unit 130.

Figure 8:
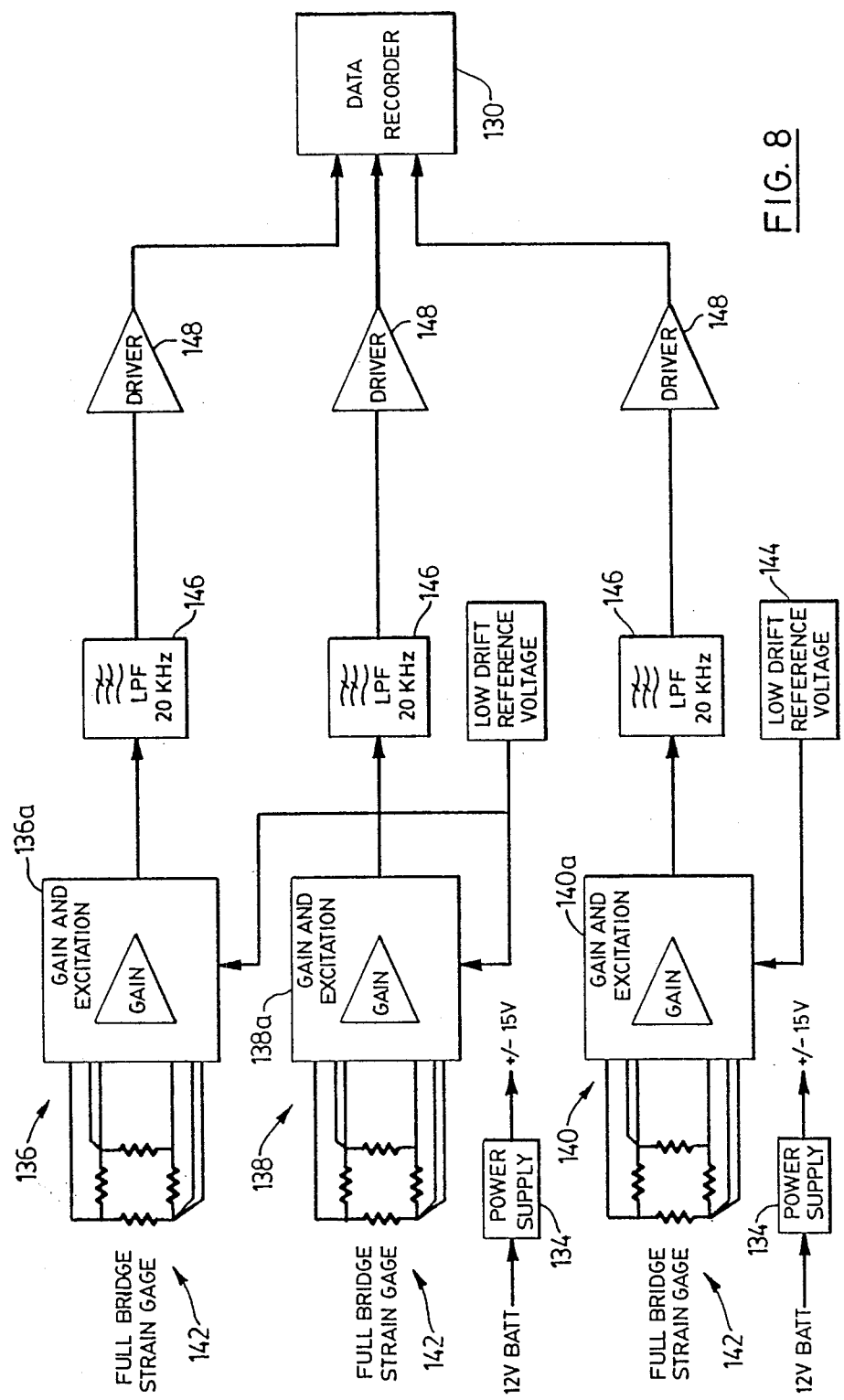
FIG. 8 is a schematic diagram of the sensor unit sensing circuit.

The circuit board 122 has a number of functions, but generally it may be referred to as a signal conditioning unit. As shown in FIG. 8, a power supply 134 is provided, externally, and may be, for example, a portable 12 volt battery. Three strain gauge channels 136, 138 and 140 are provided for in the circuitboard 122. As previously mentioned, each set of four of the strain gauges 49, are arranged in a wheatstone bridge configuration 142, in a known manner for each channel 136, 138 and 140 as shown. Each strain gauge bridge 142 has its own excitation and gain block indicated as 136a, 138a and 140a. A low drift reference voltage 144 is also provided for generation of low drift excitation levels. Low pass filters 146 are also provided as shown, on each strain channel, to eliminate high frequency noise that may be present. Drivers 148 are also provided on each channel 136, 138 and 140 to feed the signal onto the data collection unit 130. The circuit board 122 will preferably incorporate a voltage reference circuit, an amplification and excitation circuit, a power supply circuit and a low pass filter and driver circuit, which are not separately shown. It may also incorporate an analog to digital signal converter, whereby the outputs from the circuitboard would be coded in binary format.

Preferably, the data collection unit 130, is a microprocessor, such as a personal computer. The data collection unit 130, is adated to transmit data to a central analyzing unit 132, preferably a computer with sufficient capabilities to analyze and record the static and dynamic wave forms generated by each sensor unit 2. The data may be transmitted between the data collection unit 130, and the analyzing unit 132 by optical cable (not shown). In this manner, the analyzing unit 132 may separately interrogate a plurality of data collection units 130, in rapid succession. Alternatively, the data collection unit 130 and the data analyzing unit 132 could be combined into a single computer, provided that sufficient storage and computation memory was provided.

The dynamic data is most usefully analyzed using fast fourier transformations, P-wave (pressure) and S-wave (shear) arrival times, Young's modulus and Poisson's ratio. As a result of the sensitivity of the sensor unit 2, a dynamic response of up to at least 20,000 hz. can be monitored. This enables the detection of the separate arrival times of the P-waves and S-waves, which in turn make it possible to determine Young's modulus and Poisson's ratio for the mass being monitored.

Any change in the stress distribution within the mass being monitored, will result in changes to the borehold diameter. In addition to measuring dynamic changes, as indicated above, the sensing unit may be left within a given borehole for a long period of time, such as months. Thus along with changes in elastic properties over time, stress built up over time can be monitored. Thus, an indication can be obtained of whether the mass being monitored is yielding over time, which is particularly useful in analyzing the likelihood, for example, of rock bursts occurring.

It can now be appreciated how the present invention may be used to monitor in situ stresses in a mass of material. First, a borehole 8 is formed in the material. To obtain good results, it is preferrable to have the borehole 8, in the region to be monitored, have as smooth sidewalls as possible. Thus, it is preferred to use a diamond reaming bit to ensure the borehole diameter is accurate. In the preferred embodiment, the borehole diameter is 2.980 inches.

It can also now be appreciated that in the rest position (ie before being inserted into the borehole 8 ), the pressure buttons 56 extend somewhat beyond 2.980" in diameter The purpose for this is two fold. Firstly, it ensures that when in position, good contact is made between the borehole wall 8, and the sensing lever 48. Secondly, because the levers 48 are "spring loaded", they will be able to track movement of the borehole wall 8 diametrically outwardly, as well as inwardly. In FIG. 3, the inward deflection of the levers 48 is shown as heavy line 99. It has been found that satisfactory results are achieved when the external diameter of the pressure buttons is 3.010 inches in the rest position. However, to accomodate slight variances in borehole diameter, it is possible to vary the button 56 thickness slightly. In fact, buttons 56 of varying thickness could be kept on site and used as required.

The next step is to mount the sensor unit 2 onto the end of the tool 100, in a manner as described above. Once so mounted, the tool 100 can be used to insert the sensor unit into the borehole 8, to the desired depth. During the insertion step, the flange 10 will act as a wiper blade, clearing rock chips and detritus from the sides of the borehole 8. Then, by use of the handle structure 111, the sensor unit 2 can be oriented to any desired orientation. Note that while the pressure buttons 56 and associated levers 48 are oriented at 60° apart, other declinations could be used. For example, two opposed sets of levers 48 could be used, at 90° apart. However, this would reduce the usefullness of the device by reducing the amount of data collected and the ability to determine orientations of stress planes.

The next step is to use the tool 100, as described above, to tighten end cap 76 against the elastomeric washers 86. This causes the sensor unit to be both centered in the borehole 8, and secured in place, by elastomeric material at both the head end 4 and trailing end 6, which isolates the body of the sensor unit 2 from any shock waves. Once in position, the tool 100 can be retracted, and monitoring can begin.

When the sensor unit 2 is in position changes in the diameter of the borehole 8 will be transmitted to the sensing cantilevers 48 by the pressure buttons 56. The strain gauges 49 will convert the deflections into electrical signals, which while faint, will be enhanced right within the sensor unit 2 by means of the circuit board 122. The data is then sent to the data collector 130, and stored. Then, as required, it is sent on to the analyzing unit 132, and analyzed. It can even be displayed in real time, if desired, at the analyzing unit 132.

Figure 6:
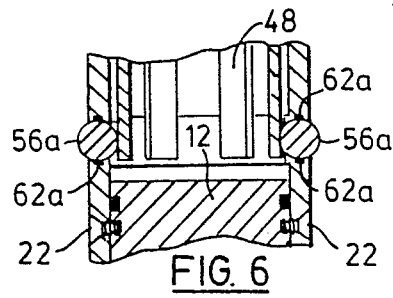
FIG. 6 is a partial plan view of a second embodiment of the sensor unit of FIG. 1.

It will of course be appreciated that the preceding description relates to particular preferred embodiments of the invention and that many modifications are possible within the broad scope of the invention. Some of these modifications have been indicated above and others will be apparent to a person skilled in the art. For example, while the invention is described in reference to an sensor unit having tubular pressure buttons 56, spherical ones could also be used, as shown as 56a in FIG. 6, provided adequate seals 62a could be maintained, to prevent water from penetrating the sensor unit 2.

We claim:

1. A sensor unit for use in an in situ material stress monitor for measuring changes in static and dynamic material stresses, said sensor unit being mountable in a borehole in the material to be monitored, the sensor unit comprising:
   a generally hollow waterproof tubular body having means for shock isolating said body from said material,
   a transducer mounted within said body, said transducer providing an output signal responsive to the deflection of the sidewall of the borehole,
   and a means for coupling said transducer to said sidewall.

2. The sensor unit of claim 1 wherein said transducer is a monolithic element having a plurality of cantilevered sensing levers.

3. The sensor unit of claim 2 wherein said means for coupling said transducer to said sidewall comprises a plurality of pressure buttons housed in said body, each having part spherical outer and inner surfaces, said outer surface contacting said sidewall of said borehole, and said inner surface contacting said sensing levers adjacent the free end thereof.

4. The sensor unit of claim 2 wherein said sensing levers, in cross section, have part cylindrical outer surfaces, and said means for coupling said transducer to said sidewall comprises a plurality of pressure buttons housed in said body, each having part spherical outer and inner surfaces, said outer surface contacting said sidewall of said borehole, and said inner surface contacting on said part cylindrical outer surface of said sensing levers.

5. The sensor unit of claim 4 wherein each sensing lever has a natural frequency of response of 4 khz.

6. The sensor unit of claim 2 wherein each sensing lever has a natural frequency of response of up to about 20 khz.

7. The sensor unit of claim 2 wherein said transducer has 6 sensing levers oriented at between 55 and 65 degrees from each other.

8. The sensor unit of claim 7 wherein each lever has four strain gauges mounted thereon.

9. The sensor unit of claim 2 wherein each lever has a plurality of strain gauges mounted thereon for providing an output signal responsive to the deflection of the sidewall.

10. The sensor unit of claim 2 wherein said transducer is formed from 17-4 PH stainless steel.

11. The sensor unit of claim 1 wherein said means for shock isolating said body from said material comprises:
a first shock absorbing flange at a front end of the body, and
a second shock absorbing securing means at a rear end of the body.

12. The sensor unit of claim 11, wherein the first flange snuggly fits within said borehole, and the securing means is of variable diameter, said variable diameter being extendable to center and secure said sensor unit in position in said borehole.

13. An in situ stress monitor comprising a sensor unit, a data collection unit and a data analyzing unit,
the sensor unit adapted to be mounted in a borehole in the material to be monitored and coupled with the sidewall thereof, said sensor unit including a means for providing an output signal proportional to the deflection of the sidewall of the borehole and a means for enhancing said output signal comprising a signal conditioning unit having a means for providing a reference voltage, a means for amplifying said output signal, a means for eliminating high frequency noise and a means for supplying power, all to form a data collection signal and a means for directing said data signal to the data collection unit,
the data collection unit collecting said data signal, the data collection unit including a means for storing said data and a means for transmiting said data; and
a data analyzing unit including means for receiving and storing said data from said data collection unit, and means for analyzing said data.

14. The monitor of claim 13, wherein said data analyzing unit further includes a means for displaying said analyzed data.

15. A method of monitoring in situ changes in static and dynamic materials stresses, comprising:
(a) forming a borehole in the material to be monitored including polishing at least a portion of the interior of said borehole and sweepng clear said polished surface;
(b) inserting a sensor unit therein,
(c) orienting the sensor unit to a preferred orientation;
(d) sensing the deflection of the sidewalls at the boreholes;
(e) converting said deflection into an output data signal; and
(f) analyzing data produced by said monitoring.

16. The method of claim 15 wherein said step of orienting the sensor unit to a preferred orientation includes simultaneously centering and securing a body of said sensor unit within said borehole, thereby isolating said body of said sensor unit, from said sidewall.

17. The method of claim 15 wherein said step of sensing deflection of the sidewalls of the borehole further comprises coupling a plurality of pressure buttons between said sidewall and a monolithic transducer carried within said body of said sensor unit converting said deflection into electrical output, amplifying said output within said sensing unit, and directing said output to a data collector.

18. The method of claim 15 wherein said step of analyzing data produced by said monitoring comprises gathering said data from at least one data collection unit, storing and analyzing said data at an analyzing unit, and displaying the results of said analysis.

* * * * *